United States Patent
Lunev et al.

(10) Patent No.: US 8,973,019 B1
(45) Date of Patent: Mar. 3, 2015

(54) METHOD AND SYSTEM FOR EMULATION OF SUPER SPEED DEVICES IN VIRTUAL MACHINES

(71) Applicant: Parallels IP Holdings GmbH, Schaffhausen (CH)

(72) Inventors: Denis Lunev, Moscow (RU); Kirill Korotaev, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 0 days.

(21) Appl. No.: 14/071,924

(22) Filed: Nov. 5, 2013

Related U.S. Application Data

(60) Provisional application No. 61/724,331, filed on Nov. 9, 2012.

(51) Int. Cl.
  *G06F 9/54* (2006.01)
  *G06F 9/455* (2006.01)
  *G06F 9/445* (2006.01)

(52) U.S. Cl.
  CPC .............. *G06F 9/45545* (2013.01); *G06F 8/65* (2013.01); *G06F 9/45558* (2013.01)
  USPC .......................................................... 719/327

(58) Field of Classification Search
  CPC .................. G06F 2009/45579; G06F 9/45558; G06F 9/45545; G06F 8/65
  See application file for complete search history.

(56) References Cited

U.S. PATENT DOCUMENTS

| | | | |
|---|---|---|---|
| 2009/0019192 A1* | 1/2009 | Yeh ................................. | 710/52 |
| 2009/0265722 A1* | 10/2009 | Lu et al. ......................... | 719/327 |
| 2011/0173353 A1* | 7/2011 | Bauman et al. ................. | 710/28 |
| 2012/0290761 A1* | 11/2012 | Chen et al. ..................... | 710/305 |

\* cited by examiner

*Primary Examiner* — H S Sough
*Assistant Examiner* — Syed Roni
(74) *Attorney, Agent, or Firm* — Bardmesser Law Group

(57) ABSTRACT

A method and system for emulation of super speed external devices in a virtual machine (VM), including checking the ability of the VM Guest OS to support the super speed external device. If the super speed device is not supported by the Guest OS, device metadata is substituted by the metadata of the devices supported by the Guest OS. The method replaces the metadata of a new external device by the metadata of an older or different (supported) device. A VM acquires a descriptor of the external device configuration and "patches" the device by replacing device version data from a new device version to an older (or different) device.

16 Claims, 5 Drawing Sheets

METHOD AND SYSTEM FOR EMULATION OF SUPER SPEED DEVICES IN VIRTUAL MACHINES

CROSS-REFERENCE TO RELATED APPLICATIONS

This application is a non-provisional application of U.S. Provisional Patent Application No. 61724331, filed Nov. 9, 2012, entitled METHOD AND SYSTEM FOR EMULATION OF HIGH SPEED DEVICES IN VIRTUAL MACHINES, incorporated by reference herein in its entirety.

BACKGROUND OF THE INVENTION

1. Field of the Invention

The present invention relates to virtualization, and more particularly, to emulation of super speed external devices in Virtual Machines (VMs).

2. Description of the Related Art

The industry trend of virtualization and isolation of computer system resources presents some challenges with regard to use of external devices by Virtual Machines. A Virtual Machine (VM) is a type of an isolated Virtual Environment where multiple VMs can run on the same physical machine simultaneously. Each VM instance has a set of its own software components and uses hardware modules of the physical machine where the VM resides.

Typically, there are multiple VMs created on a host operating system. In such system, some resources of the host operating system can be isolated and allocated for running each of the VMs. An example of this type of system is a computing environment provided by VMware™. The VMware™ solution provides standardized isolated secured computing environments. This product is typically used as an enterprise-level solution, where a number of VMware™ Virtual Machines are distributed throughout the computer system. However, the VMware™ solution does not provide adequate support for using system hardware for support and acceleration of the VMs.

Virtualization allows running a number of VMs on the same physical machine. Examples of conventional virtualization solutions are virtual systems by VMware™, Parallels Software International, Inc., Microsoft Virtual Server, Microsoft/Citrix Terminal Server, Virtuozzo™ by SWSoft (Parallels), Xen systems by XenSource, Solaris Zones, etc. All of these systems, however, provide only limited support for a low level (i.e., hardware) virtualization.

With Virtual Machine (VM) technology, a user can create and run multiple virtual environments on a physical server at the same time. Each virtual environment (such as a VM), requires its own operating system (a Guest OS) and can run applications independently. The VM software provides a layer between the computing, storage, and networking hardware and the software that runs on it.

A majority of VM Guest OSs can work seamlessly with most of the external devices connected to a host via USB or FireWire interfaces. Virtual Machines (VM) run software applications that connect real devices with the Guest OS by pushing the device commands through to a virtual hub, which receives requests from the Guest OS. The "push through" approach allows the Guest OS to see the external devices "as is." A virtual hub is an emulated physical hub, which is used to increase a number of available ports.

USB 3.0 device can function in 2 different modes. The choice is made electrically based on the number of contacts in the USB socket. In these modes, the device returns different metadata for standard requests, including GET_DESCRIPTOR, etc. If the host controller is USB 3.0 capable, the device returns 3.0 metadata only.

However, if the Guest system runs an outdated OS (for example, some legacy OS intended for use on older, less powerful, computers), which does not support interfaces of the super speed USB, problems can occur. For example, Linux 2.4 does not support super speed USB 3.0. Thus, it is not possible to plug a device into 3.0 USB port in Guest as it will not be seen at all (since there is no driver in the Guest). In this case, it is possible to plug the device into 2.0 USB port, although there will be a problem due to different metadata format. Conventional operating systems, especially legacy ones, do not provide any mechanism to fix this problem. They rely on the hardware layer, which is not applicable, as described above.

Accordingly, there is a need in the art for a method for virtualization of external devices in the VMs in order to use them by the Guest systems running older versions of the OS. In particular, the invention is intended to operate in the host in USB 3.0 mode and USB 2.0 mode in the VM.

SUMMARY OF THE INVENTION

The present invention is related to a method and system for emulation of external devices in a virtual machine (VM) that substantially overcomes the disadvantages of the related art.

In one aspect, a method for replacing metadata of a new external device by metadata of an older device is provided. A method for emulation of super speed external devices in the VM includes checking the ability of the Guest OS to support the external device. If the super speed device is not supported by the Guest OS, the device metadata is substituted by the metadata (i.e., a device descriptor and a configuration descriptor) of the devices supported by the Guest OS. Then the Guest OS handles packets from hardware controller using native guest OS drivers.

A VM acquires a descriptor of the external device configuration and "patches" the device by replacing device version data from, for example, USB 3.0 to an older USB 2.0. Subsequently, the "patched" device descriptor is passed into the Guest OS by emulation means. The VM Guest operating system (running an old OS version, for example, Windows XP) can see the external device as a USB 2.0 device, and the VM can work with the device.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Figure 1:
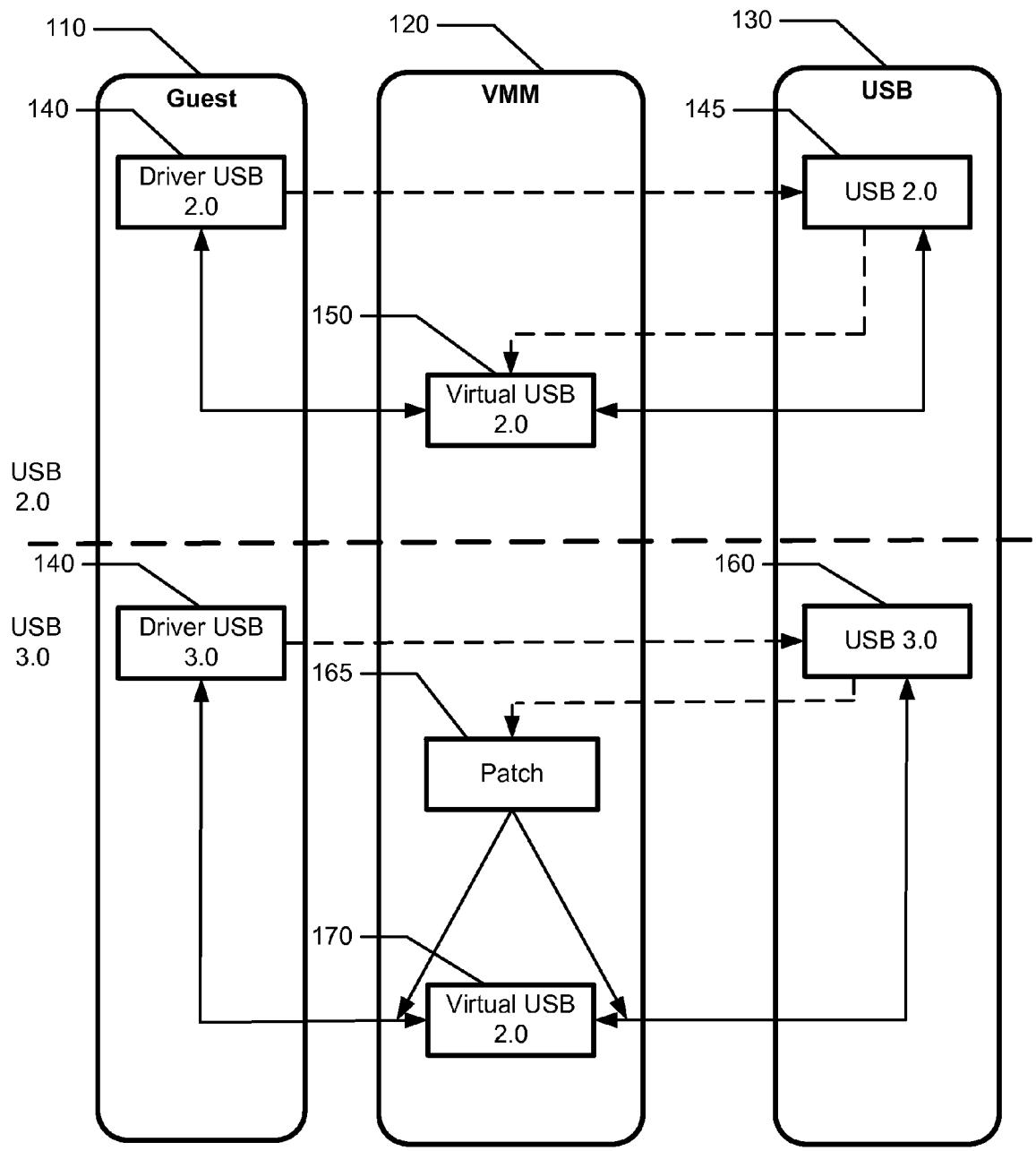
FIG. 1 illustrates a device emulation method, in accordance with the exemplary embodiment.

Reference will now be made in detail to the embodiments of the present invention, examples of which are illustrated in the accompanying drawings.

The present invention is related to a method and system for communication of external devices with a virtual machine (VM). In one aspect, a method for replacing metadata of a new external device by metadata of an older device is provided.

A Hypervisor (or, alternatively, a VMM—Virtual Machine Monitor) is a virtualization module running in a host OS (or replacing the host OS) that allows for running of the Guest OSes on the physical machine. The Hypervisor provides for isolation of the OSs from each other and for resource allocation between the OSs.

A virtual USB Packets transmitting channel is used for exchange of data between physical devices and a Guest system.

When the USB device is physically connected to physical Host USB controller, VMM (or a hypervisor) gets a descriptor of the external device configuration that may be or may be not correspond to the Guest OS possibilities, for example Guest OS USB device driver. If Guest OS does not support the device version Host starts a procedure that control transmitting channel and "patches" the device by replacing device version data from, for example, USB 3.0 to an older USB 2.0. Subsequently, the "patched" device descriptor is passed into the Guest OS. The VM (running an old OS version, for example, Windows XP) can see the external device as a USB 2.0 device and the VM can work with the device. A structure of data packets changes accordingly to the USB 2.0 protocol. The device descriptors of USB 3.0 and USB 2.0 have different formats (i.e., different fields). The patch code translates one format into another. In particular, the maximum sizes of packet allowed to be sent via the device interface are coded differently in a device descriptor fields (USB 3.0 allows for much larger packets). Thus, the patch code corrects the differences in device descriptor and configuration descriptor formats in order to "deceive" the VM guest drivers. If the drivers encounter a wrong format of the descriptor, they cannot operate with this format. The patch code is executed at a host interface level.

Universal Serial Bus (USB) is a serial interface of a data bus for external devices of various data transmission speeds. The USB devices can be of three types: streaming (bulk) devices, isochronous devices and interrupt devices. Low speed devices (such as a mouse) cannot have isochronous or streaming channels. Examples of bulk devices are a USB flash storage, a network card, and a printer. Examples of isochronous devices are a video camera or a microphone. Examples of interrupt devices are a keyboard, a mouse, a trackball or a joystick. All types of the devices support data transmission over a control channel (for exchanges of request-answer packets).

According to the exemplary embodiment, the metadata (i.e., a device descriptor, configuration descriptor and an end point descriptor) of a new device is substituted by the metadata of an old device. For example, for USB devices, a VM user wants his Guest OS (e.g., Windows XP, Windows 7, Windows 8 or higher, or Linux 2.4 or higher) to work with a flash-storage connected via a USB interface. The user can open configurations of the VM running Windows XP or Linux 2.4, find a bookmark "USB-storages" and click on "connect USB-device" menu. Then, when a USB 3.0 is connected to a virtual hub device driver, an enumeration process is launched and the Guest OS sends a request GET_DESCRIPTOR to read the device configuration descriptors. GET_DESCRIPTOR is executed for all USB modes.

Note that the enumeration reads all of the device-related data. In the exemplary embodiment, the enumeration is directed to reading the device descriptors. The device descriptor is a metadata describing the device to a host machine. The descriptors have a hierarchical structure. According to the exemplary embodiment, a configuration descriptor is used. The configuration descriptor reflects an amount of power taken by the bus powered USB device from the bus. The configuration descriptor can also determine if the device is self-powered. The configuration descriptor also reflects a number of device interfaces. The hierarchy of USB descriptor is: Device Descriptor>Configuration Descriptor>Interface Descriptor>Endpoint Descriptor.

There is also an optional String Descriptor. For example Configuration Descriptor has fields: bNumInterfaces (number of interfaces, submitted for this configuration); bConfigurationValue (which is used in the query SetConfiguration to select this configuration); bmAttributes (specifies the power options to configure); bMaxPower (specifies the maximum power consumption of the device from the USB bus) and optionally some others.

When the device goes through enumeration, the host reads the device descriptor and decides which configuration to apply. Note that the host can normally allow only one of the available configurations. A descriptor(s) system can differ depending on a device type.

Once the VM acquires the configuration descriptor, the VM "patches" the descriptor by substituting the data related to a device version. Thus, the device version is changed, for example, from a USB 3.0 to a USB 2.0. Subsequently, the "patched" descriptor is provided to the Guest system by emulation means. Note that if there is a USB driver in a Guest system, there is no need for patching. The Guest OS (e.g., Windows XP or higher or Linux 2.4 or higher) begins to see the devices as a USB 2.0 device and can now work with the device. When a USB device is initialized, the metadata data (i.e., an endpoint descriptor and a device descriptor) is read by the host controller.

The speed of data transmission using USB 3.0 bus is much higher than the speed of the USB 2.0 bus. According to the exemplary embodiment, the "patched" version of the USB 2.0 bus provides a speed of the data transmission that is about 2.5 times higher (or, in any event, significantly higher) than that of a regular USB 2.0 bus operating with the Guest OS.

According to the exemplary embodiment, the patch is created once in the beginning of working with the USB bus. When the Guest OS calls the USB device (within a continuous session), no additional actions are performed by the VM applications. Note that the patch does not reduce the productivity of the system. After the VM is re-launched, the original patch is still needed, but patching is performed automatically. The Device descriptor is: version 3.0→2.0, size of endpoint 0 descriptor. The Config descriptor is: a size of each endpoint descriptor and all super-speed endpoint companion descriptors are dropped.

Here, patching is the changing of field bConfigurationValue in Configuration Descriptor (using non-native bConfigurationValue in SetConfiguration query). According to the exemplary embodiment, each USB device is connected (by default) to a root hub on a host machine. The root hub interfaces all communications between the external device and the host. Whenever the device is switched for working with the VM Guest OS, the host continues to see the device, but cannot work with it. The Guest system works with the host external device using a low-level API via a virtual hub.

If a USB device is being connected via computer's USB port while the VM is running, a VMM (or a hypervisor) interrupts this event and gives a user a choice of "pushing through" the device to the VM. Note that "push through" operation gives the VM Guest OS exclusive use of the external device. If the user chooses this option, the Guest system begins to work with the USB device and the host terminates its operations with this device. However, if the user does not choose the "push through" option, the Guest does not see the device, while the host continues to work with the device. If the "push through" option is selected, the device descriptor is substituted (patched) and pushed through to the Guest device driver.

This method is implemented in Parallels Desktop™. Note that if the user chooses the "push through" option, the system remembers it. So, when the next VM session is started, the external device is "pushed through" to the VM automatically. Also, the device can be taken away from the VM and given back to the host by changing the device configuration.

In order to return the USB device used by the Guest system back to the host, the VM needs to be turned off. Alternatively, the device needs to be tuned off in the VM device configuration list.

The user gives a command to pass the device to the Guest 110. The VMM 120 reads the device descriptor and parses it. The VMM 120 must locate a virtual USB port to plug the device into. If the device is a 1.0 or 2.0 USB device 140, it plugs the device into a 1.0 or 2.0 virtual port in the Guest, respectively. If the device 140 is USB 3.0 according to the device descriptor, the VMM 120 checks whether a USB 3.0 controller is initialized by the Guest. Usually the driver performs several operations to start the device 140, and the VMM 120 keeps the status on the host side. If a USB 3.0 controller 130 is initialized, then the device 140 is connected to a USB 3.0 virtual port 160, and a patching algorithm is not started. Otherwise, the device 140 is connected to a USB 2.0 port 145, and the patching mechanics is initiated. The VMM 120 detects whether the USB 3.0 stack is initialized by the VM on an appropriate emulation layer. After that, the device 140 is plugged into the virtual hub 150. If the USB 3.0 controller 160 is not initialized, then the device is plugged into USB 2.0 jack on a virtual hub 170. The, the VM starts device initialization and requests a device descriptor. The VM reads the descriptor from the physical device and patches it appropriately using patch 165. All subsequent operations are initialized by the Guest and redirected to the device in "pass through" mode.

According to the exemplary embodiment, if a VM user requests to connect to an external device, the VMM reads a device descriptor and determines a virtual port for plugging the device: #1.1 device→1.1 guest port #2.0; device→2.0 guest port #3.0=3.0 controller enumerated→3.0, guest port=2.0 guest port in the other case. The VMM 120 plugs the device into port (sets an interrupt and writes a correct register status in the controller). The Guest driver detects device presence and starts emulation. The VMM re-reads descriptors (if needed) and patches them according to the algorithm.

Figure 2:
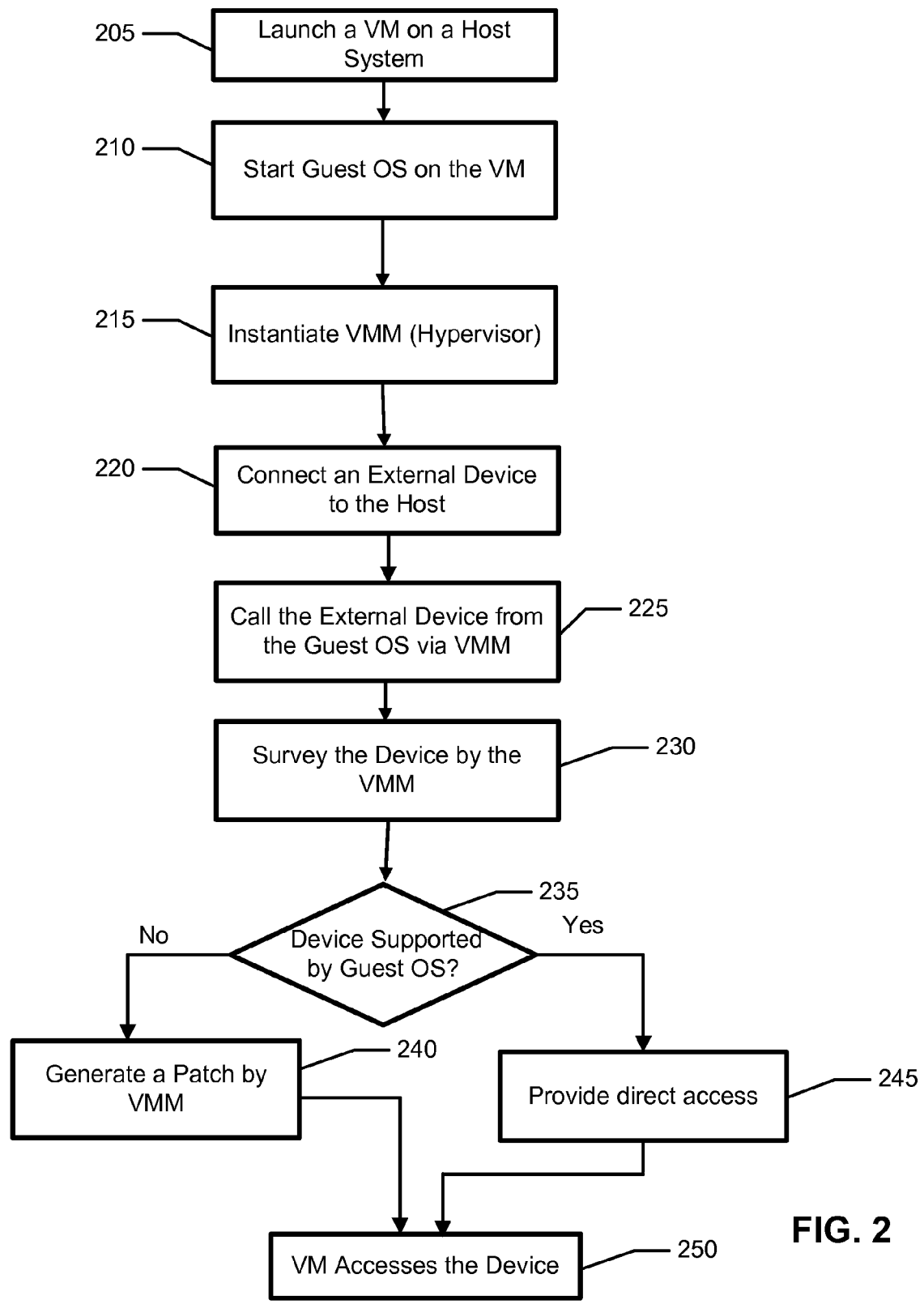
FIG. 2 illustrates a flow chart of a method in accordance with the exemplary embodiment.

FIG. 2 illustrates a flow chart of a device emulation method in accordance with the exemplary embodiment. A VM is launched on a host system in step 205. A Guest OS is started in the VM in step 210. A VMM (or a Hypervisor) is instantiated in step 215. An external device is connected to the host system in step 220. Then, in step 225, the external device is called by a device driver from the Guest OS via the VMM. The device is surveyed by the VMM in step 230. The VMM acquires the device descriptor and determines, in step 235, if the device is supported by the Guest OS.

If the USB 3.0 device is not supported by the Guest OS, the VMM launches a virtualization inside Host OS in step 240. If the USB device is a USB 3.0 device and Guest OS supports USB 3.0 devices, the VMM performs operations without emulation and substitution step 245. Subsequently, the VM accesses the device in step 250.

According to the exemplary embodiment, if a hardware node has a super speed hardware interface (e.g., USB 3.0) and the VM running on the hardware node does not have a Guest driver for the super speed hardware interface, a channel interception procedure is implemented between the super speed hardware interface and the Guest driver. The channel interception procedure is implemented only for the duplex channel, which can be implemented as an asynchronous channel. If the device is initialized as a low speed device (e.g. USB 2.0), the interception procedure is deactivated.

However, if the device is recognized as a super speed device, the intercept procedure substitutes the super speed device descriptor by a low speed device descriptor. Then, when the procedure receives a command from the driver "activate as a low speed device," the procedure replaces this command with "activate as a super speed device." According to one exemplary embodiment, if the Guest has channel speed limiting procedures (preventing packet losses), these procedures are turned off or deceived.

Figure 3:
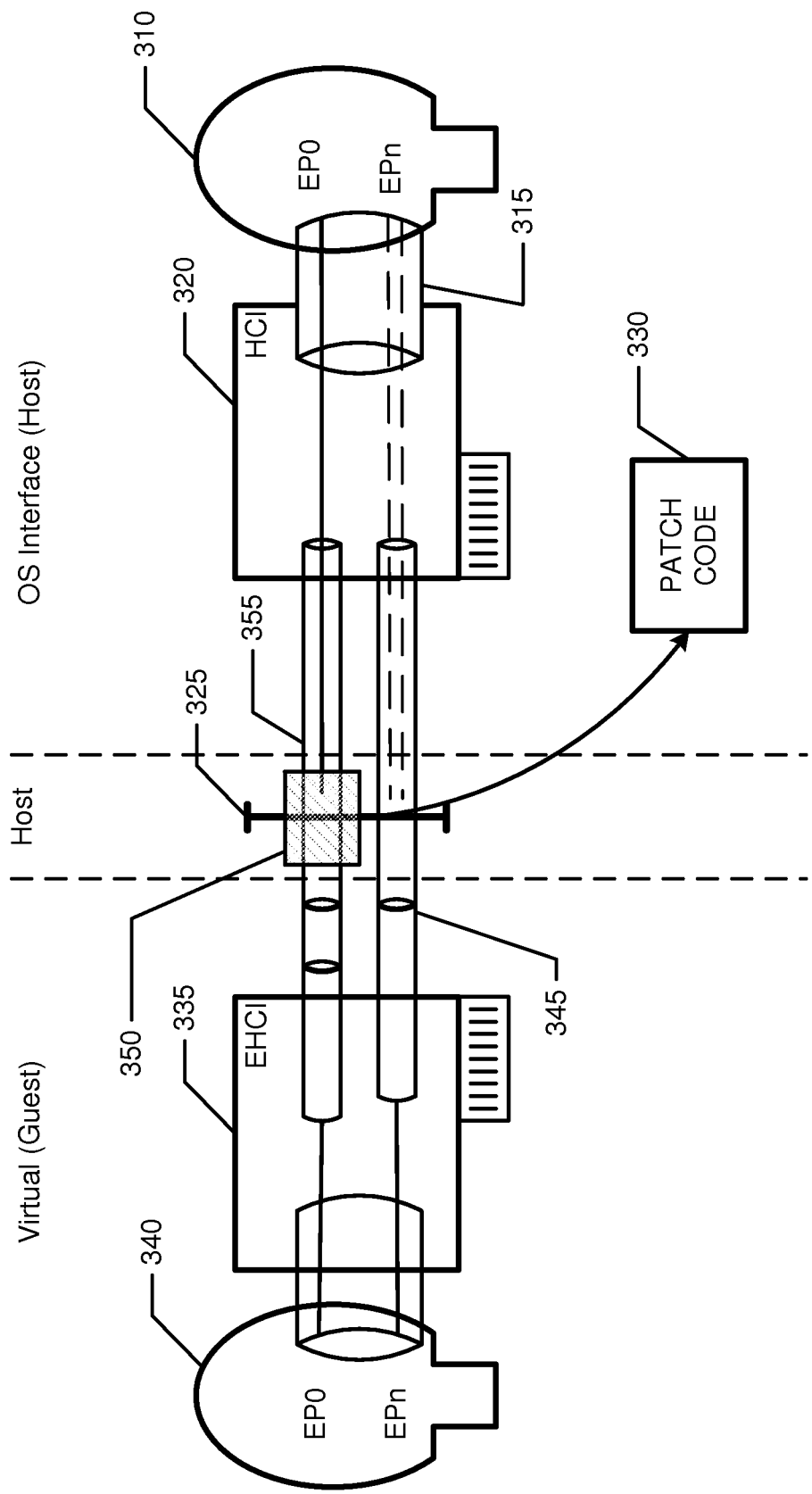
FIG. 3 illustrates system architecture, in accordance with the exemplary embodiment.

FIG. 3 illustrates system architecture in accordance with the exemplary embodiment. A host node has a super speed USB device connected via endpoints 310. The endpoints are connected via a USB cable 315 to a host controller interface 320. The host controller interface 320 is connected to an emulated host controller interface 335 via a control pipe 355, which goes through a host device interface 325. The emulated host controller interface 335 does not have a driver for the fast USB device. The USB descriptor is intercepted on the control pipe 355 and patched for a low speed USB device by a patching component 350 executing a patch code 330. The guest system slow speed USB device end points 340 receive data and the emulated host controller pushes it through to the host controller 320 via a second channel of a duplex control pipe. The USB device metadata goes through a special interface 345, which changes the metadata format in order to be processed by the fast USB device.

Figure 4:
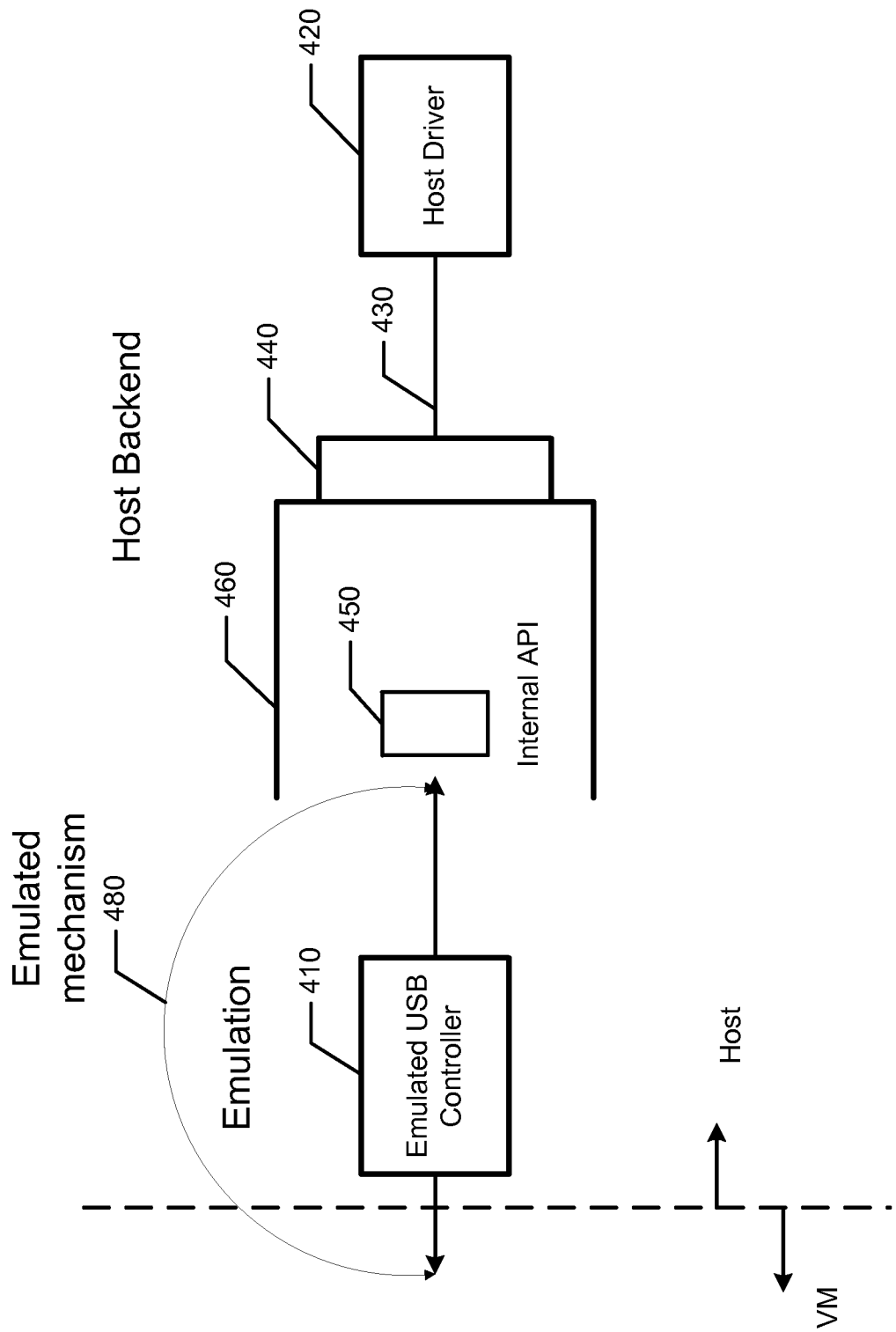
FIG. 4 illustrates patching of the device descriptor, in accordance with the exemplary embodiment.

FIG. 4 illustrates patching of the device descriptor, in accordance with the exemplary embodiment. A host device driver 420 for a super speed USB device communicates with an emulated USB controller 410 via a host driver interface 430. The emulated USB controller does not have a driver for the super speed USB device. The host driver interface communicates with an internal API 460 via an interface between the internal API 460 and a host API. The internal API 460 executes a patching component 450, which substitutes a descriptor of the super speed USB device by a descriptor of the low speed USB device, so the emulated USB controller 410 can communicate with the host driver 420.

Figure 5:
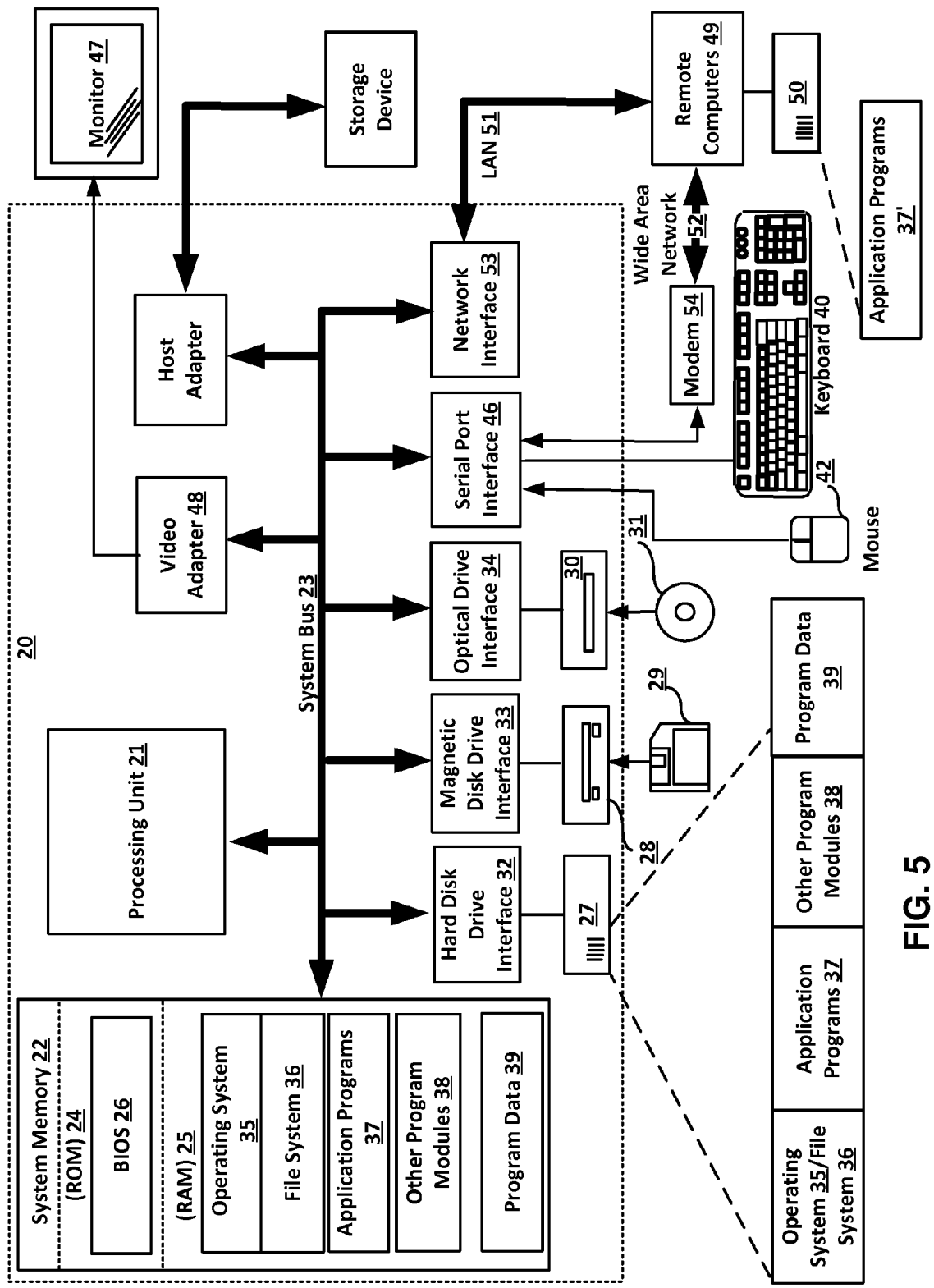
FIG. 5 illustrates a schematic diagram of an exemplary computer or server that can be used in the invention.

With reference to FIG. 5, an exemplary system for implementing the invention includes a general purpose computing device in the form of a host computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the host computer 20, such as during start-up, is stored in ROM 24. The host computer 20 may further include a hard disk drive 440 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the host computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS™ 2000). The host computer 20 includes a file system 36 associated with or included within the operating system 35, such as the WINDOWS NT™ File System (NTFS), one or more application programs 37, other program modules 38 and program data 39. A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device 57, such as a hard disk drive, a magnetic tape, or other type of storage device is also connected to the system bus 23 via an interface, such as a host adapter 55 via a connection interface 56, such as Integrated Drive Electronics (IDE), Advanced Technology Attachment (ATA), Ultra ATA, Small Computer System Interface (SCSI), SATA, Serial SCSI and the like.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the computer 20.

The computer 20 may further include a memory storage device 50. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46.

In a networked environment, program modules depicted relative to the host computer 20, or portions thereof, may be stored in the remote memory storage device. It will be appreciated that the network connections shown are exemplary and other means of establishing a communications link between the computers may be used.

Having thus described the different embodiments of a system and method, it should be apparent to those skilled in the art that certain advantages of the described method and apparatus have been achieved. In particular, it should be appreciated by those skilled in the art that the proposed method provides for emulation of the host external devices not supported by the VM Guest OS.

It should also be appreciated that various modifications, adaptations, and alternative embodiments thereof may be made within the scope and spirit of the present invention. The invention is further defined by the following claims.

What is claimed is:

1. A computer-implemented method for emulating external devices in a Virtual Machine (VM), the method comprising:
    activating a Virtual Machine Monitor (VMM);
    launching a VM on a host computer system under control of the VMM, the host computer system having at least one external device;
    starting a Guest Operating System (OS) on the VM;
    calling the external device from the Guest OS via the VMM;
    acquiring metadata of the external device in the VMM;
    launching a virtual device huh within the VM, if the device is supported by the Guest OS based on the metadata;
    generating a patch, in the VMM, if the device is not supported by the Guest OS based on the metadata;
    patching the device metadata; and
    accessing the external device using a Guest driver of the VM via an emulated device controller,
    wherein the external device is an interrupt USB 3.0 device or an isochronous USB 3.0 device.

2. The method of claim 1, wherein the patching of the device metadata comprises substituting a device descriptor by a device descriptor supported by the Guest OS.

3. The method of claim 1, further comprising blocking the host computer system from using the external device for a VM session.

4. The method of claim 1, wherein the device metadata comprises a device configuration descriptor and endpoint descriptor.

5. The method of claim 4, wherein the device configuration descriptor reflects a version of the device.

6. The method of claim 1, wherein the patching substitutes a new device version by an old device version.

7. The method of claim 1, further comprising storing the virtual device hub in an operating memory of the host computer system.

8. The method of claim 1, further comprising applying the patch automatically at a next launch of the VM by the emulated device controller.

9. The method of claim 1, wherein the VMM has an internal API, which acquires the device metadata using an enumeration process.

10. The method of claim 1, further comprising accessing the external device in the Guest OS via the virtual hub using a low-level API call.

11. A system for emulating external devices in a Virtual Machine (VM), comprising:
- a processor;
- a memory; and
- a computer program logic stored in the memory and executed on the processor, the computer program logic is configured to execute steps of claim 1.

12. A system for emulating external devices in a Virtual Machine (VM), the system comprising:
- a host node;
- a super speed external device connected to the host node;
- a Virtual Machine (VM) running on the host node;
- a VM Guest OS having a Guest device driver that does not support the super speed external device; and
- a Virtual Machine Monitor (VMM) configured to intercept a device metadata before passing it to the Guest device driver, wherein
- the VMM acquires a metadata of the super speed external device; and
- the VMM patches the device metadata with the metadata of a device supported by the Guest device driver; and
- wherein the external device is an interrupt USB 3.0 device or an isochronous USB 3.0 device.

13. The system of claim 12, wherein the VMM patches the external device metadata by substituting a device descriptor by a device descriptor of the device supported by the Guest device driver.

14. The system of claim 12, wherein the VMM uses a patching component executed on the host node.

15. The system of claim 12, wherein the VMM uses an enumeration process for acquiring the device metadata.

16. The system of claim 12, further comprising a virtual hub for accessing the external device by the Guest device driver.

* * * * *